3,745,143
VULCANIZABLE OLEFIN COPOLYMERS AND
PROCESS FOR THEIR PREPARATION
Francis Paul Baldwin, Summit, and Guido Sartori, Linden, N.J., and Jean Lefebvre, Brussels, Belgium, assignors to Esso Research and Engineering Company
No Drawing. Filed Mar. 27, 1972, Ser. No. 238,641
Claims priority, application Great Britain, Mar. 7, 1972, 238,641/72
Int. Cl. C08f 15/40
U.S. Cl. 260—41.5 R                15 Claims

ABSTRACT OF THE DISCLOSURE

A new class of linear, high molecular weight copolymers of ethylene, 2.3-dimethyl-2.5-norbornadiene and one or more alpha-olefins of the general formula R—$CH_2$=$CH_2$, wherein R is an alkyl containing 1–4 carbon atoms.

---

The present invention describes a new class of linear, high molecular weight copolymers of ethylene, 2.3-dimethyl-2.5-norbornadiene (henceforth called dimethylnorbornadiene) and one or more alpha-olefins of the general formula R—CH=$CH_2$, where R is an alkyl containing 1–4 carbon atoms. The alpha-olefin is preferably propylene or 1-butene.

In another aspect the invention provides a process to prepare the above copolymers by means of organometallic catalysts.

Several dienes or trienes have been described in the literature as possible comonomers useful to introduce unsaturation into elastomers based on ethylene-alpha-olefins copolymers. However in no case is the use of dimethylnorbornadiene mentioned.

In a copending application Ser. No. 238,658 filed Mar. 27, 1972, the new diene is described as well as related dienes and a process of preparing them by a Diels-Alder reaction between cyclopentadiene, which may be substituted and 2-butyne.

The diene termonomers which are suitable for the invention and which should possess a free double bond for polymerization can be represented by the following formula,

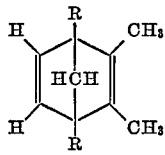

wherein the R's, which ned not be equal represent hydrogen or alkyl groups, preferably $C_1$–$C_4$ alkyl groups.

Thes diene termonomers have the particular advantage that the corresponding monomer units contain a high number of allylic methyl hydrogens, which leads to a high vulcanization rate of its copolymers with ethylene and alpha-olefins. The percentages by weight of the monomers in the terpolymers which are the object of the present invention can vary within broad limits. Ethylene can vary between 5 and 90%, dimethylnorbornadiene between 0.5 and 20%, the alpha-olefin(s) being the balance. If an amorphous product is desired, the ethylene content should not normally exceed 75% by weight. Under these conditions, the copolymers, according to the invention, are soluble in aliphatic, cycloaliphatic, aromatic or chlorinated hydrocarbons, such as n-hexane, n-heptane, cyclohexane, toluene, xylenes, $CCl_4$, chlorobenzene, tetrachloroethylene. The molecular weight of the copolymers, according to the invention, can very within broad limits. A non-restrictive interval for the intrinsic viscosity, measured in tetrahydronaphthalene at 135° C., can be comprised between 0.1 and 10 dl./g.

The distribution of the monomer units in the copolymers object of the present invention is nearly random. The fact that unsaturation is distributed homogeneously is shown by the possibilities to obtain good vulcanizates, using techniques normally employed for unsaturated elastomers, particularly those with low unsaturation content. Apart from the vulcanization, the double bonds present in the polymer chain can be used for other reactions, for example oxidation, ozonization, halogenation, etc. which gives rise to polar groups, useful in their own right or for subsequent reactions.

Alternatively, the double bonds present in the copolymers, according to the invention, can be used to graft another monomer or mixture of monomers onto the copolymer.

The vulcanizates obtained from the copolymers, according to the present invention, are completely insoluble in organic solvents and are moderately swollen by aromatic solvents. To obtain high tensile strengths, reinforcing agents, such as carbon black, can be incorporated into the copolymers before vulcanization. The copolymers of the present invention can be oil-extended. Aliphatic, cycloaliphatic or aromatic oils can be used for that purpose.

The copolymers can be vulcanized with sulfur and accelerators, as well as with peroxide, as is known for saturated ethylene-propylene copolymers.

Several applications are possible for the copolymers in question. They can be used, i.e., for the manufacturing of tyres, tubes, conveyor belts, sheets, gaskets and to cover electric wires.

The catalysts used in the process of the present invention are prepared by reaction of organoaluminums with vanadium compounds. Non restrictive examples of the organoaluminums are trialkylaluminums, dialkyl aluminum halides, alkyl aluminum sesquihalides and dihalides, such as triethyl aluminum, tri-n-propylaluminum, triisobutyl aluminum, tri-n-hexyl aluminum, diethyl aluminum chloride, diisobutyl aluminum chloride, diethyl aluminum fluoride, ethyl aluminum dichloride, ethyl aluminum sesquichloride.

Nonrestrictive examples of vanadium compounds that can be used in the process of the present invention are halides, alcoholates, haloalcoholates, acetylacetonates, haloacetylacetonates, such as $VOCl_3$, $VCl_4$, $VO(OC_2H_5)_3$, $VOCl(OC_2H_5)_2$, $VOCl_2(OC_2H_5)$, $VOAcac_2$, $VAcac_3$. Preferably at least one of the catalyst components is halogenated. Instead of vanadium compounds or in addition to them also titanium compounds, such as halides or alcoholates can be used. Examples are titanium tetrachloride, titaniumtetraisobutylate, titanium tetraisopropylate, and dicyclopentadienyl titaniumdichloride.

The two catalyst components can be reacted with one another outside or inside the polymerization mixture. In the former case the use of a diluent is advisable.

The preformed catalyst or the separate catalyst components can be added to the monomer mixture periodically or continuously.

The molar ratio between the organoaluminum and the vanadium compound can be varied within broad limits. In general, a moderate to large excess of organoaluminum is useful; as it can act as a scavenger for possible impurities, such as water, oxygen or sulfur compounds. In general, molar ratios Al/V between 1:1 and 10:1 are satisfactory.

The process of the present invention can be carried out in the presence or in the absence of a solvent. In the former case, aliphatic, cycloaliphatic or aromatic hydrocarbons can be used, such as n-hexane, n-heptane, cyclohexane, benzene, toluene. Halogenated solvents can be used as well, provided they are inert towards the catalyst. Nonrestrictive examples are trichloroethylene, tetrachloroethylene, chlorobenzene, dichlorobenzenes.

In case no solvent or a non-solvent is used, the monomer mixture acts as a dispersing agent. If, e.g., propylene is the alpha-olefin, stirring problems are reduced, owing to the insolubility of the copolymer in the reaction mixture which is then a slurry. Similar slurry processes derive from the use of inert non-solvents such as methyl chloride or methylene chloride for example.

The temperature at which the process of the present invention can be carried out can be varied within broad limits. Temperatures between −50 and +80° C. are generally satisfactory, but the copolymerization can be carried out also outside this temperature range.

The process of the present invention can be carried out at atmospheric pressure, but pressures above or below atmospheric can also be used.

To obtain compositionally homogeneous copolymers, the ratios between the monomers present in the reaction mixture must be kept as constant as possible throughout the reaction, e.g., by feeding and discharging continuously a monomer mixture of suitable composition and by vigorous stirring during the polymerization.

EXAMPLE 1

The reaction apparatus is a 250 ml. flask, equipped with Teflon blade stirrer, inlet and outlet tube for gases and two dropping funnels for the catalyst components, kept under nitrogen.

The catalyst components are $AlEt_2Cl$, 0.5 M in heptane, and $VOCl_3$, 0.1 M in heptane.

100 ml. of dry n-heptane is put into the reactor, which is then cooled to −20° C. Ethylene and propylene are fed to the reactor, below the surface of the heptane, at rates of 1000 and 4000 l./h. respectively. 0.5 ml. of 2,3-dimethylnorbornadiene is added. 1 mmole of $AlEt_2Cl$ and 0.2 mmole of $VOCl_3$ are added. The reaction starts immediately, as shown by an increase in thickness of the reactor content. After 10 minutes, 0.5 mmole of $AlEt_2Cl$ and 0.1 mmole of $VOCl_3$ are added.

After 25 minutes from the beginning, the reaction is stopped by adding methanol. The product is diluted with benzene and shaken in a separatory funnel with diluted HCl and then with water, coaguled in methanol and dried in vacuum. The weight is 3.1 g. Analysis by infrared spectroscopy shows that the propylene content is about 37 mol percent. NMR analysis shows the presence of allylic hydrogens.

A sample of terpolymer is mixed on a roll mixer with the following ingredients, parts per 100 parts by weight of terpolymer.

| | |
|---|---|
| FEF carbon black | 110 |
| Oil S 178 | 70 |
| Stearic acid | 2 |
| ZnO | 5 |
| S | 2 |
| Mercaptobenzothiazole | 1.5 |
| Tetramethylthiuramdisulfide | 0.8 |
| Tellurium diethyl dithiocarbamate | 0.8 |
| Dipentamethylene thiuramtetrasulfide | 0.8 |

Vulcanization is carried out at 160° C. for 20 minutes. The following mechanical properties are measured:

| | | |
|---|---|---|
| Tensile strength | p.s.i. | 670 |
| Elongation at break | percent | 130 |
| 100% modulus | p.s.i. | 425 |

EXAMPLE 2

The reaction apparatus is a 1—1 flask, equipped with Teflon blade stirrer, two dropping funnels and inlet and outlet tubes for gases.

300 ml. of n-heptane is put into the apparatus and cooled to −20° C. Ethylene and propylene are fed at 1000 and 4000 l./h. respectively and 0.5 ml. of 2,3-dimethylnorbornadiene is added. 2 ml. of a 0.5 M solution of $AlEt_2Cl$ in heptane (1 mmole) and 2 ml. of a solution obtained by dissolving 0.09 ml. of $VOCl_3$ (1 mmole) in 10 ml. of heptane are added. A violet color appears. After 10 minutes an equal amount of catalyst is added. After 30 minutes from the beginning, methanol containing phenyl-beta-naphthylamine is added. The product is purified as in the previous example. The weight of dry polymer is 7.2 g. Examination by infrared spectrography shows that the propylene content is 43 mol percent. NMR analysis shows the presence of allylic hydrogens.

A sample is vulcanized, using the same recipe as in the previous example.

The following mechanical properties are measured:

| | | |
|---|---|---|
| Tensile strength | p.s.i. | 1170 |
| Elongation at break | percent | 330 |
| 300% modulus | p.s.i. | 1090 |

What we claim is:

1. Linear, high molecular weight copolymers of ethylene, 2.3-dimethyl-2.5-norbornadiene and one or more alpha-olefins of the general formula R—CH=CH$_2$, wherein R is an alkyl containing 1–4 carbon atoms.

2. A copolymer according to claim 1, wherein the alpha-olefin is propylene or 1-butene.

3. A copolymer according to claim 1, wherein the amount of polymerized ethylene is in the range of 5 to 90 wt. percent, the amount of 2.3-dimethyl-2.5-norbornadiene is in the range of 0.5 to 20 wt. percent, the alpha-olefin(s) being the balance.

4. A copolymer according to claim 1, wherein the intrinsic viscosity as herein defined is in the range of 0.1 to 10 dl./g.

5. A copolymer according to claim 1, wherein the copolymer is amorphous, the amount of polymerized ethylene not exceeding 75 wt. percent.

6. A copolymer according to claim 1, which has been vulcanized with sulphur and accelerators or peroxide.

7. A copolymer according to claim 6, which has been vulcanized after addition of carbon black.

8. A copolymer according to claim 6, which has been vulcanized after oil-extension.

9. A process for preparing a copolymer according to claim 1, wherein the reactants are polymerized in the presence of a catalyst prepared by reaction of organoaluminums with vanadium compounds titanium compounds or mixtures thereof in the presence of an inert diluent which may be either a solvent or a non-solvent for the polymer under the conditions of polymerization.

10. A process according to claim 9, wherein the organoaluminums comprise trialkylaluminums, dialkyl aluminum halides, alkyl aluminum sesquihalides and dihalides, like triethyl aluminum, tri-n-propylaluminum, triisobutyl aluminum, tri-n-hexyl aluminum, diethyl aluminum chloride, diisobutyl aluminum chloride, diethyl alminm fluoride, ethyl alminum dichloride and ethyl aluminum sesquichloride.

11. A process according to claim 9, wherein the vanadium compounds comprise halides, alcoholates, haloalcoholates, acetylacetonates, and haloacetylacetonates.

12. A process according to claim 9, wherein at least one of the catalyst components is halogenated.

13. A process according to claim 9, wherein the titanium compounds are halides or alcoholates.

14. A process according to claim 9, wherein the molar ratio between aluminum and vanadium is in the range of 1:1 to 10:1.

15. A process according to claim 9, wherein the molar ratio between aluminum and titanium is in the range of 1:1 to 10:1.

References Cited
UNITED STATES PATENTS
3,590,023    6/1971    Valvassori _____ 260—79.5

JOSEPH L. SCHOFER, Primary Examiner
R. S. BENJAMIN, Assistant Examiner

U.S. Cl. X.R.
260—79.5 B, 80.78, 666 PY